United States Patent
Zenith et al.

(10) Patent No.: US 9,612,360 B2
(45) Date of Patent: Apr. 4, 2017

(54) WELL TESTING APPARATUS AND METHODS FOR MEASURING THE PROPERTIES AND PERFORMANCE OF OIL AND GAS WELLS

(71) Applicants: NORWEGIAN UNIVERSITY OF SCIENCE AND TECHNOLOGY (NTNU), Trondheim (NO); SINVENT AS, Trondheim (NO)

(72) Inventors: Federico Zenith, Trondheim (NO); Johannes Tjønnas, Trondheim (NO); Ingrid Schjølberg, Trondheim (NO); Bjarne Foss, Trondheim (NO); Vidar Gunnerud, Trondheim (NO)

(73) Assignees: NORWEGIAN UNIVERSITY OF SCIENCE AND TECHNOLOGY (NTNU), Trondheim (NO); SINTEF TTO AS, Trondheim (NO)

( * ) Notice: Subject to any disclaimer, the term of this patent is extended or adjusted under 35 U.S.C. 154(b) by 291 days.

(21) Appl. No.: 14/358,560

(22) PCT Filed: Nov. 16, 2012

(86) PCT No.: PCT/EP2012/072897
§ 371 (c)(1),
(2) Date: May 15, 2014

(87) PCT Pub. No.: WO2013/072490
PCT Pub. Date: May 23, 2013

(65) Prior Publication Data
US 2014/0318234 A1    Oct. 30, 2014

(30) Foreign Application Priority Data

Nov. 17, 2011 (GB) .................................. 1119847.0
Nov. 17, 2011 (NO) .................................. 20111580

(51) Int. Cl.
*G01V 11/00* (2006.01)
*E21B 49/00* (2006.01)
(Continued)

(52) U.S. Cl.
CPC .............. *G01V 11/00* (2013.01); *E21B 47/06* (2013.01); *E21B 47/065* (2013.01); *E21B 47/10* (2013.01); *E21B 49/008* (2013.01)

(58) Field of Classification Search
CPC ....... G01V 11/00; E21B 47/06; E21B 47/065; E21B 47/10; E21B 49/008
See application file for complete search history.

(56) References Cited

U.S. PATENT DOCUMENTS

| 3,559,476 A | 2/1971 | Kuo Chiang-Hai |
| 3,908,454 A * | 9/1975 | Mullins ................. E21B 47/101 |
| | | 181/102 |

(Continued)

FOREIGN PATENT DOCUMENTS

| CA | CA 2774181 A1 * | 4/2011 | ........... E21B 49/008 |
| GB | 2235540 A | 3/1991 | |

(Continued)

OTHER PUBLICATIONS

International Search Report and Written Opinion dated Jul. 16, 2013 (PCT/EP2012/072897); ISA/EP.

(Continued)

*Primary Examiner* — David Bolduc
(74) *Attorney, Agent, or Firm* — Banner & Witcoff, Ltd.

(57) ABSTRACT

To determine properties of multiple oil and gas wells, oscillations at different test frequencies are applied to the flow rate and/or pressure of multiple wells. Measurements of flow rate and/or pressure and temperature in flows downstream of a production header of the multiple wells are then obtained. Such measurements from the flows of the multiple (Continued)

wells are subjected to a frequency analysis of the pressure, flow rate and/or temperature measurements to determine pressure, flow rate and/or temperature variations induced by the applied oscillations. Properties of the different wells of the multiple wells based on the results of the frequency analysis are thus determined.

19 Claims, 11 Drawing Sheets

(51) Int. Cl.
*E21B 47/06* (2012.01)
*E21B 47/10* (2012.01)

(56) References Cited

U.S. PATENT DOCUMENTS

| | | | | |
|---|---|---|---|---|
| 4,458,245 | A * | 7/1984 | Crosnier | E02D 1/02 166/250.02 |
| 5,144,590 | A * | 9/1992 | Chon | G01V 1/42 367/38 |
| 5,220,504 | A | 6/1993 | Holzhausen et al. | |
| 5,662,165 | A * | 9/1997 | Tubel | E21B 23/03 166/113 |
| 6,333,700 | B1 * | 12/2001 | Thomeer | E21B 23/00 166/254.2 |
| 6,650,280 | B2 * | 11/2003 | Arndt | G01F 23/284 342/124 |
| 6,724,687 | B1 * | 4/2004 | Stephenson | G01V 1/40 166/250.1 |
| 6,920,085 | B2 | 7/2005 | Finke et al. | |
| 8,261,819 | B1 * | 9/2012 | Gibbs | E21B 47/10 166/250.03 |
| 2002/0027004 | A1 * | 3/2002 | Bussear | E21B 37/06 166/250.15 |
| 2002/0082815 | A1 | 6/2002 | Rey-Fabret et al. | |
| 2003/0213591 | A1 | 11/2003 | Kuchuk et al. | |
| 2006/0108120 | A1 | 5/2006 | Saucier | |
| 2009/0067288 | A1 | 3/2009 | Godager | |
| 2009/0308601 | A1 | 12/2009 | Poe, Jr. et al. | |
| 2011/0119037 | A1 | 5/2011 | Rashid et al. | |
| 2012/0146805 | A1 * | 6/2012 | Vick, Jr. | E21B 47/14 340/853.2 |

FOREIGN PATENT DOCUMENTS

| NO | 325614 B1 | 6/2008 |
|---|---|---|
| WO | 2007116006 A1 | 10/2007 |

OTHER PUBLICATIONS

UKIPO Search Report dated Jan. 30, 2012 (GB1119847.0).
NIPO Search Report and Office Action dated May 15, 2012 (NO20111580).
Rochon J et al: "Method and Application of Cyclic Well Testing With Production Logging", SPE Annual Technical Conference and Exhibition, Sep. 21-24, 2008, Denver, Colorado, USA, Society of Petroleum Engineers, No. SPE 115820, Sep. 21, 2008 (Sep. 21, 2008), pp. 1-15, XP002530733, DOI: 10.2118/115820-MS abstract Introduction Technique and Background Tool Review Application Process.
Peter A Fokker et al: "Application of harmonic pulse testing to water oil di splacement", Journal of Petroleum Science and Engineering, Elsevier, Amsterdam, NL, vol. 79, No. 3, Sep. 12, 2011 (Sep. 12, 2011), pp. 125-134, XP028113488, ISSN: 0920-4105, DOI: 10.1016/J.PETROL.2011.09.004 [retrieved on Sep. 17, 2011] abstract, figures 6,7 1. Introduction, 2. Theoretical Background, 3. Analytical formulation, 5. Conclusions.
C.H. Kuo: "Determination of Reservoir Properties from Sinusoidal and Multi rate Flow Tests in One or More Wells", Society of Petroleum Engineers Journal, vol. 12, No. 6, Dec. 1, 1972 (Dec. 1, 1972), XP055068508, ISSN: 0197-7520, DOI: 10.2118/3632-PA abstract Discussion.
D.A. Bradley et al: "Improving Prudhoe Bay Pulse-Test Data by Processing With Fourier Transforms", Proceedings of SPE Annual Technical Conference and Exhibition, Jan. 1, 1988 (Jan. 1, 1988), XP055068509, DOI: 10.2118/18124-MS ISBN: 978-1-55-563578-7 abstract Discussion Application.
Sanghui Ahn et al: "Estimating Permeability Distributions From Pressure Pulse Testing", Proceedings of SPE Annual Technical Conference and Exhibition, Jan. 1, 2010 (Jan. 1, 2010), XP055068516, DOI: 10.2118/134391-MS ISBN: 978-1-55-563300-4 Summary Methodology Multiple frequency information.
Florian Hollaender Imperial College London et al: "Harmonic Testing for Continuous Well and Reservoir Monitoring", SPE Annual Technical Conference and Exhibition, Sep. 29-Oct. 2, 2002, San Antonio, Texas, Society of Petroleum Engineers Inc, No. SPE 77692, Sep. 29, 2002 (Sep. 29, 2002), pp. 1-12, XP002630729, DOI: 10.2118/77692-MS Introduction.
Peter A Fokker et al: "Estimating reservoir heterogeneities from pulse testing", Journal of Petroleum Science and Engineering, Elsevier, Amsterdam, NL, vol. 86, Mar. 15, 2012 (Mar. 15, 2012), pp. 15-26, XP028518612, ISSN: 0920-4105, DOI: 10.1016/J.PETROL.2012.03.017 [retrieved on Mar. 27, 2012] abstract, 1. Introduction, 2. Numerical solution in the Fourier space.

* cited by examiner

WELL TESTING APPARATUS AND METHODS FOR MEASURING THE PROPERTIES AND PERFORMANCE OF OIL AND GAS WELLS

CROSS-REFERENCE TO RELATED APPLICATIONS

The present application is a U.S. National Phase filing of International Application No. PCT/EP2012/072897, filed on Nov. 16, 2012, designating the United States of America and claiming priority to British Patent Application No. 1119847.0, filed Nov. 17, 2011 and to Norwegian Patent Application No. 20111580, filed Nov. 17, 2011, and this application claims priority to and the benefit of the above-identified applications, which are all incorporated by reference herein in their entireties.

BACKGROUND OF THE INVENTION

The present invention relates to a well testing apparatus and a method of well testing, both being for determining properties of oil and gas wells.

Well testing methods are used in the oil and gas industry to measure the properties of oil wells and to monitor ongoing performance of the wells. It is desirable to determine properties of a well such as gas-oil ratio (GOR), water cut (WC), skin, permeability thickness, productivity index (PI), inflow performance relationship (IPR) and reservoir properties. Well tests are performed on a regular basis in order to monitor well performance and to meet regulatory requirements. Data obtained by the tests can be used to optimise production, for example maximisation of oil production within constraints on water and gas production. An oil reservoir will typically be accessed by multiple wells, each connected to a production header that combines the flow from each well and conveys the fluid stream from the well to a production separator where the oil, gas and water is separated. Since the flow from each well is combined, the fluid stream at the separator provides hardly any information about individual wells. In order to obtain data for the individual wells a dedicated test header is used. The header includes valves enabling the flow from individual wells to be controlled, for example to shift flow from the production header to the test header. To test a well the production flow rate at the well is controlled and pressure data is gathered, which will relate to that well. The conventional test procedures involve measurements for one well at a time.

Various types of well tests are known. The different well test types are characterised by different flow steps and are used at different points in the life of the well. A drawdown test is carried out after a well is put on production either initially or when valves are re-opened after an extended shut in period. Pressures are monitored as the flow rate is changed from zero flow to production flow rates. For wells that are on production a build-up test is used. In a build-up test a producing well is shut in by closing the valves and pressure data is measured. Soon after a well is shut in, the fluid in the wellbore usually reaches a state in which bottomhole pressure rises smoothly and is easily measured. Multi-rate tests are also used, in which the flow is stepped between different rates. Testing of producing wells can be used to monitor and optimise well performance. There is also generally a regulatory requirement for routine testing to be carried out.

The pressure data from each well is analysed to determine the well properties of interest. Since the test state of the well differs from its normal production state then reconciliation of the data is required. For example, it is necessary to allow for changes in the gas-liquid equilibrium that occur during production when the flows from multiple wells are combined in the production header.

These conventional well testing methods are time consuming and expensive. Sequential testing of multiple wells takes a large amount of time, and the loss in production when the wells are shut in can be considerable. A typical set of build-up tests covering ten wells might require a week long test campaign with an eight hour shut in period for each well.

SUMMARY OF THE INVENTION

Viewed from a first aspect, the invention provides a method of well testing to determine properties of oil and gas wells, the method comprising: applying oscillations to the flow rate and/or pressure at multiple wells, wherein the oscillations applied at different wells of the multiple wells are at different test frequencies; receiving measurements of flow rate in flow(s) downstream of a production header that combines the flows from the multiple wells and/or receiving measurements of pressure and/or temperature from individual wells; carrying out a frequency analysis of the pressure, flow rate and/or temperature measurements to determine pressure, flow rate and/or temperature variations induced by the applied oscillations; and determining properties of the different wells of the multiple wells based on the results of the frequency analysis at the test frequencies for the wells.

With this method the properties of individual wells can be determined without the need to carry out individual tests for each well and without the need to shut in the wells. A dedicated test header is not required, and this can reduce the complexity and cost of the field equipment. Production continues via the production header throughout the course of the test, and although the applied oscillations will likely reduce the average flow rate the reduction in production is low compared to the reduction in production for a conventional test, such as a build-up test. For a field with ten wells, production during a test campaign can be over 4% higher for the method of the invention as compared to an equivalent build-up test. The wells are tested in parallel with measurements of each individual well being determined by looking at the effects of the oscillation frequency applied for that well. By means of the frequency analysis, these effects can be isolated from other variations in the output flow. The testing occurs with production online and with normal flow patterns during the mixing of flow from the multiple wells. Thus, in contrast to conventional testing, because there is no shut-in of the well during testing then there is no need for subsequent reconciliation of measured results to take account of changes in the flow patterns arising from the test process. This removes a source of errors from the test procedure. As discussed below the method can also be used for batches of wells when there is a large number of wells. In this case some reconciliation will be necessary, but at a reduced level.

In preferred embodiments the pressure/flow rate for the multiple wells is controlled at the wellhead in order to apply the oscillations. The step of applying oscillations may include sending control signals to equipment at the wellhead and/or may include the step of controlling flows and/or pressures at the wellhead. The oscillations may be applied via an existing valve in the wellhead. Using existing valves in this way means that the method requires no modifications to existing field equipment to apply the oscillations, aside from changes to the control system to implement the required control of the valve opening/closing. It is preferred to use the choke valve to apply the oscillations to the flow rate from the well. Choke valves can be easily controlled to open and close gradually in order to apply a waveform of the selected frequency to the flow rate.

The oscillations are preferably approximately sinusoidal, for example waveforms applied via stepwise changes in the valve position in order to approximate a sine wave. The use of a sine wave, or an approximation thereof, provides accurate results when the output data is analysed using conventional frequency analysis techniques, such as techniques based on the Fourier transform.

Preferably, the method includes selecting the frequencies for the oscillations based on characteristics of a typical production frequency spectrum for the wells. This allows the frequencies to take account of the underlying frequency spectrum that occurs in typical variations in pressure, flow rate and/or temperature occurring during normal production, and thus can enable the frequencies to be selected to avoid frequencies where factors such as damping or noise might interfere with the results of the test. The production waveform may be a measurement of total production flow rate or production pressure over a period of time, for example over several days. The selection of frequencies is preferably based on a recent measurement of the production waveform, which may be a waveform measured directly before the time of the well test.

The method may hence include selecting frequencies for the oscillations by carrying out frequency analysis of the production waveform and identifying a suitable frequency range, preferably a frequency range with low damping and low noise. It has been found that production waveforms typically exhibit damping and hence reducing amplitudes at higher frequencies, and that at lower frequencies there is noise arising from operational processes. Thus, preferably the frequency range is selected by removing higher frequencies that exhibit damping and/or by removing lower frequencies that are obscured by noise. The frequency range is also preferably a range with a stable baseline in a frequency/amplitude plot. The frequency range may be a range selected from frequencies between 0.01 mHz to 10 mHz. The frequency range may exclude frequencies below 0.1 mHz and/or may exclude frequencies above 1 mHz, depending on the specific characteristics of the field. Thus, in one preferred embodiment the frequency range is 0.1 mHz to 1 mHz.

The frequency analysis used in identifying suitable oscillation frequencies is preferably based on a Fourier transform. The use of a fast Fourier transform (FFT) algorithm is preferred, since this provides considerable advantages in relation to the speed of the analysis.

When a suitable frequency range has been selected it is necessary to determine the test frequencies to be used for the oscillations at the wells. The step of determining the test frequencies preferably includes determining frequency slots within the frequency range that will not interfere with one another. The step of determining frequency slots preferably includes determining a spacing for the frequency slots based on the number of frequencies required and/or on the total test period available.

The selected frequencies should avoid interference with each other and with significant harmonics. Thus, they should be spaced apart and they should avoid the main harmonic (2nd harmonic) of other test frequencies. The main harmonic will be double the test frequency. Thus, for example, if a first test frequency is set as 0.1 mHz then this means that 0.2 mHz should not be another test frequency. When selecting test frequencies the method may hence include avoiding the selection of frequencies that will be affected by and/or will mask the second harmonics of other, previously selected, test frequencies.

In a Fourier analysis the total test period required to provide resolution for a given frequency spacing is the inverse of the frequency spacing. Thus, for example, a spacing of 0.5 mHz requires a minimum total sampling time of about 30 minutes, and a spacing of 50 µHz requires a minimum total sampling time of about 6 hours. Reducing the frequency spacing too much can hence result in an excessively long test time. The frequency spacing may be selected to ensure that the total test time is limited to be 60 hours or less (i.e. a spacing of 5 µHz or above), preferably 12 hours or less (i.e. a spacing of 25 µHz or above), more preferably 6 hours or less (i.e. a spacing of 50 µHz or above). When it is desired to limit the test time to 6 hours then with a frequency range of 0.1 mHz to 1 mHz there will be a maximum of 11 test frequencies available. Allowing for twice the sampling time will provide around double the number of available test frequencies, with the frequencies at a closer spacing.

The number of frequencies required will relate to the number of wells that need to be tested. In the simplest case, the method may include selecting a number of frequency slots that will provide available test frequencies for the total number of wells to be tested. However, for large numbers of wells it is not necessarily desirable to simply divide the available frequency range into sufficient frequency slots to provide available frequencies for all the wells. To allow the testing of large oil fields without the need to use an undesirably small frequency spacing the method may include grouping the wells and testing them in batches. The groups of wells may each include 2-25 wells, preferably 5-20 wells. This batch testing is still considerably quicker than conventional well testing, since the oscillation test for each batch of ten wells might require 6 hours, whereas an equivalent build-up test for each set of ten wells would require five days.

The amplitude of the oscillations should be set to ensure that the frequency analysis provides results that can be distinguished from the baseline amplitude of variations of the production waveform, for example the amplitude may be set to be an order of magnitude higher than the amplitude for the selected frequency range in a normal production waveform. The amplitude of the input oscillations may be in the range of 10-10000 $Sm^3/h$, preferably 50-1000 $Sm^3/h$. Production constraints may set a maximum for the amplitude, since an increase in amplitude can give rise to a decrease in production. The method may include determining a baseline amplitude for the selected frequency range by determining a line of best fit for the frequency/amplitude data, for example by a least squares analysis. The amplitude for the input oscillations may then be set to be at least five times larger than the baseline, preferably ten times larger. All the oscillations may be applied at the same amplitude, which could for example be a factor larger than the average baseline amplitude for all frequencies. This simplifies control of the valves (or other mechanism) used to apply the oscillations. However, in one preferred embodiment the amplitudes for each test frequency are scaled to match the baseline amplitudes at the test frequencies. This can enhance accuracy whilst avoiding unnecessary loss in production. It allows the accuracy to be set to a desired minimum based on the baseline amplitudes, without introducing unnecessarily large amplitudes.

The minimum sampling time sets a minimum time for the well test process. The total time for the test time may be set at this minimum. This provides the quickest test, which could advantageously be used for regular monitoring of wells whilst minimising production losses. It may however also be beneficial to apply the oscillations for a longer period in order to provide a more accurate set of results. If the input waveform was repeated for the entire test time then the accuracy of the frequency analysis would not be affected by increasing the sampling time. However, in practice there will be variations in the production waveform and intermittent events occurring during production that will introduce noise into the waveform. As a result a longer sampling time allows the testing to smooth out such variations and provide a better indication of the properties of the tested wells. Hence, the test time may be larger than the minimum sampling time, for example five or ten times larger. In a typical scenario even with a test time that is ten times the minimum testing period the test time will still be around half that required for a conventional build-up test.

In a preferred embodiment, the method includes applying oscillations to the well for a total test time in excess of the minimum sampling time, and then selecting a sampling time from the total test time for further analysis, the sampling time being shorter than the total test time. This enables the sampling time to be selected to avoid disturbances in the flow, for example as might be caused by shut-in of a well. Conversely, it also allows the oil field operator to proceed with required operations with minimal restrictions, since even if it is necessary to disturb the flow during a test period then the test can still provide useful results.

The measured pressure, flow rate and or temperature may include one or more of wellbore pressure, wellbore temperature, wellhead pressure, wellhead temperature, oil flow rate, gas flow rate, and/or water flow rate. The method may include measuring of this data, for example by means of sensors placed to sense the flow in the relevant flow passages. Flow measurements for flow rate of the total flow or separated flow(s) may be taken at any point downstream of the production header. Preferably, the flow measurements are taken at a point downstream of a separator that receives the flow from the production header. After the separator more measurements are possible since they can be measurements of the separated flows.

The step of carrying out a frequency analysis to determine pressure, flow rate and/or temperature variations induced by the applied oscillations may include the use of a Fourier transform as set out above, preferably a fast Fourier transform (FFT) algorithm. This produces an output frequency/amplitude plot in which the effects of the oscillation frequencies can be seen. The method preferably comprises determining properties of the different wells by determining output pressure and/or flow rate amplitude values at the test frequencies and using these amplitudes to determine the basic properties of the individual wells. The baseline amplitude for the measured output pressure/flow rate may be determined by removing data points relating to the test frequencies and their second harmonics, and then determining a line of best fit for the remaining results, for example by means of a least squares analysis as above, and this baseline amplitude may be used to provide an indication of the accuracy of the results.

Further properties of the wells may then be calculated based on the flow and/or pressure data. For example, using data relating to oil flow rate and water flow rate error propagation theory can be used to determine water cut (WC) and productivity index (PI). Given $A_o$ and $A_w$ as amplitudes for oil and water flow rates respectively then $WC=A_w/(A_o+A_w)$. Similarly, $PI=A_o/A_p$, where $A_p$ is the amplitude of downhole pressure. Also, $GOR=A_g/A_o$ where $A_g$ is the amplitude of gas flow, and IPR can be calculated by PI measured at two operating points, or using the second harmonic if the input is large enough.

The step of applying oscillations may include applying the different frequencies at different phases. If the oscillations are all applied in phase then this creates a large peak in the cumulative effect on the total production rate. This is not a problem when the production is well-limited, since the effect of the oscillations on the production output will be the same whatever the phase relationship. However, it has an adverse effect when the production is process-limited. Thus, in a preferred embodiment the phases of the applied oscillations are shifted to reduce production variations in the output flow.

The method may include a step of measuring the level of the second harmonic for the applied test frequencies. This can be used as a test to check for non-linearity in the system, since if the second harmonic is low then this is a good indicator of an absence of higher harmonics. In addition, the amplitude of the second harmonic can be used in conjunction with the amplitude of the test frequency to determine the parameters of higher-order polynomial models for the IPR or other relationships.

The method may include a step of advising users of the test results via a control or support system, and/or a step of automatically controlling the wells in response to the results of the testing. For example, well production rates may be controlled to optimise production for the oilfield or for a group of wells.

Viewed from a second aspect, the present invention provides a well test apparatus for determining properties of oil and gas wells, the apparatus comprising: a pressure and/or flow rate controller for controlling pressure and/or flow rate at multiple wells; and a data analysis device for receiving and analysing measurements of flow rate in flow (s) downstream of a production header that combines the flows from the multiple wells, and/or measurements of pressure and/or temperature in individual wells; wherein the pressure and/or flow rate controller is configured to apply oscillations in the flow rate and/or pressure at the multiple wells using different test frequencies for different wells; and wherein the data analysis device is configured to carry out a frequency analysis of the measurements of pressure, flow rate and/or temperature to determine pressure, flow rate and/or temperature variations induced by the applied oscillations, and to determine properties of the different wells of the multiple wells based on the results of the frequency analysis at the test frequencies for the wells.

The pressure/flow rate controller may control the wells by sending control signals to pressure/flow rate control devices at the wells. In some preferred embodiments, the apparatus includes these pressure/flow rate control devices, which may be at the wellhead and which preferably comprise existing valves in the wellhead. Alternatively, the control devices may be a part of a different apparatus, whilst being directly or indirectly controllable by the controller. In a preferred embodiment the pressure/flow rate control devices are choke valves. The pressure/flow rate controller may be configured to apply oscillations with waveforms, frequency, phase and/or amplitude as described above in connection with the method of the first aspect. The controller may be configured to apply the oscillations for a test time as discussed above.

In a preferred embodiment the data analysis device is configured to analyse a production waveform to find a typical production frequency spectrum and to thereby select test frequencies to be used for the oscillations based on characteristics of a typical production waveform for the wells. The production waveform may be as described above. The data analysis device may be configured to identify a suitable frequency range and optionally to determine available test frequencies as in the method discussed above.

The data analysis device is preferably configured to analyse the measured data and to determine properties of the wells as discussed above in relation to the method of the first aspect. The apparatus may include a user interface for presenting the results of the analysis to the user and/or for permitting the user to select properties to be determined.

Viewed from a third aspect, the present invention provides a computer program product comprising instructions for execution on a data processing apparatus, the apparatus including hardware or software connections to permit the control of flow rates and/or pressures of multiple wells; wherein the instructions, when executed, will configure the data processing apparatus to carry out a method of well testing as set out above. The computer program product may configure the apparatus to carry out method steps as in any or all the preferred features set out above. The data processing apparatus may include features as discussed above for the well test apparatus.

BRIEF DESCRIPTION OF THE DRAWING

Certain preferred embodiments of the invention will now be described by way of example only and with reference to the accompanying drawings, in which.

DETAILED DESCRIPTION OF EMBODIMENTS OF THE INVENTION

Figure 1:
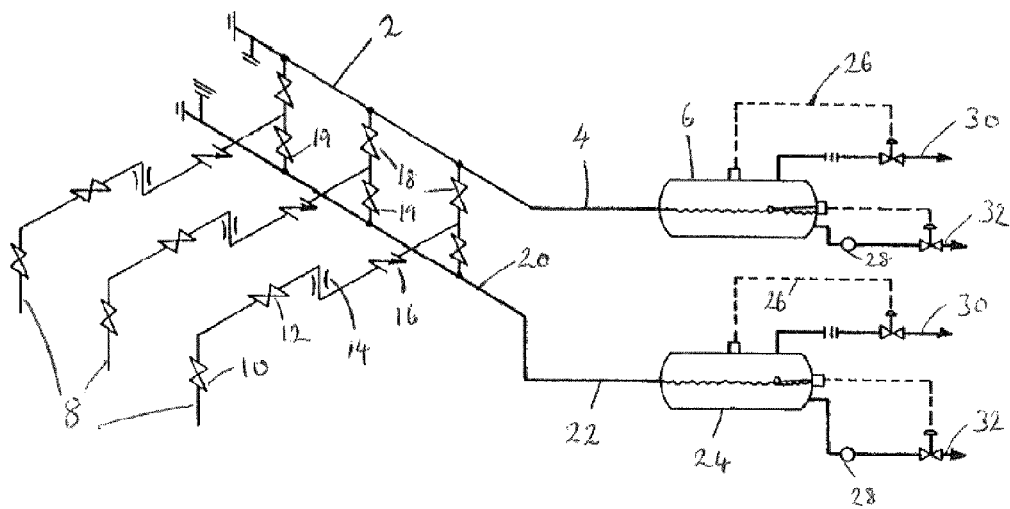
FIG. 1 is a schematic of a typical set-up for oil and gas wells.

A typical setup for conventional well testing is shown in FIG. 1. A production header 2 connects via a production flow line 4 to a production separator 6. In this case the production header 2 is connected to three wells 8. The wells 8 in this example all draw oil and gas from the same oil field. Each well 8 is connected to the header by a master valve 10, wing valve 12, choke 14 and check valve 16. Isolation valves 18 connect the production header to the lines from the wells 8. The lines from the wells are also connected via another set of isolation valves 19 to a test header 20. The test header 20 is a dedicated header used only for testing purposes. It connects via a test flow line 22 into a test separator 24. The production separator 6 and test separator 24 are tanks that separate oil and gas. Under the influence of gravity the oil settles at the base of the tank, with the gas occupying the space at the top of the tank. Each separator 6, 24 is equipped with a pressure control line 26 connecting the gas filled headspace of the separator 6, 24 to a valve on the gas outlet line 30. For each of the production separator and the test separator there is also a sampling and metering device 28 on the oil outlet line 32. After separation oil and gas are piped separately for further processing via the oil outlets 32 and gas outlets 30. The separators 6, 24 can also include a water outlet for extracting water from beneath the oil.

As explained above, during well testing one well 8 is tested at a time using prior art methods by controlling the flows in the production header 2 and the dedicated test header 20. The present well test system avoids the need to test only one well 8 at a time, and instead permits multiple wells 8 to be tested in parallel.

As described above, the present well test system of involves the use of oscillations applied to the wells 8 at set frequencies using the choke valves 14. A different frequency is used for each well 8, thereby enabling data to be obtained about multiple wells 8 simultaneously by the use of a subsequent frequency analysis. In the frequency analysis the different frequencies are used to earmark data relating to a particular well 8. There is no need to adjust the flows compared to normal production, and so this testing method gives data that directly relates to properties of the wells 8 during normal production.

With an equipment set-up of the type shown in FIG. 1 the invention is implemented by applying oscillations to the pressure and flow rate of the wells 8 via the choke valves 14. A typical choke valve 14 can be opened and closed in 200 steps over a period of about five minutes. The choke valves 14 can therefore be used with a suitably configured controller to apply oscillations in the flow rate over a wide range of possible frequencies. During application of these oscillations with choke valves 14 the well test also includes measurement of pressures at the wellhead and well bore, measurement of flows for oil and gas out of the separator 6, and also measurements of water flow rate if the separator also allows for separation of water from the oil. The test can also include gathering data relating to the gas-oil ratio, water cut and so on. The measured data is analysed and effects arising from the outputs of the various wells are identified based on a frequency analysis of the type discussed below.

Figure 2:
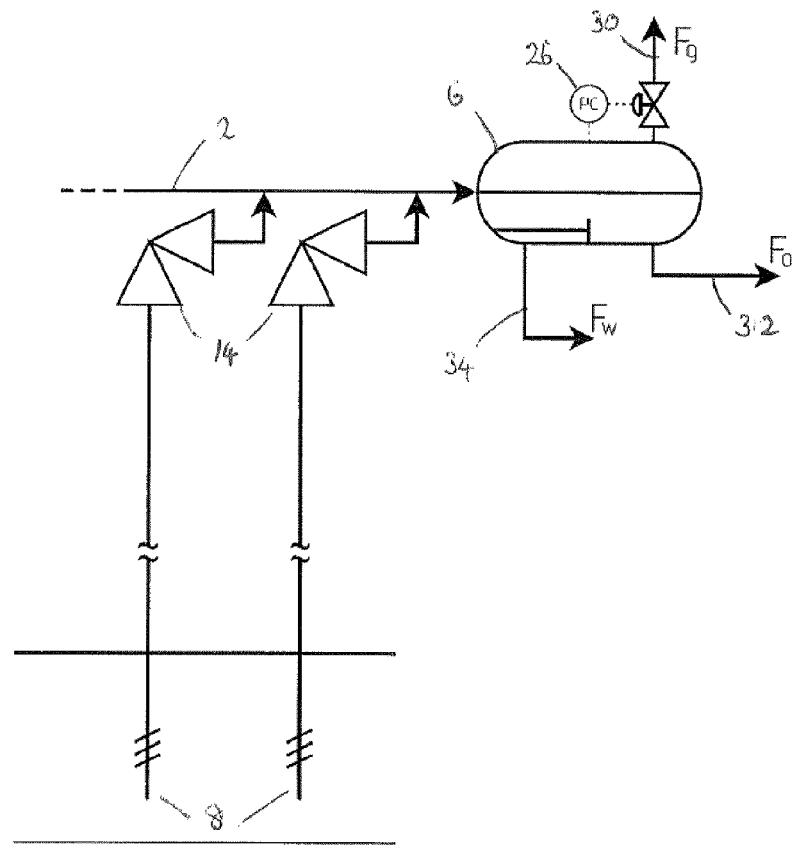
FIG. 2 shows an arrangement of field equipment in an oilfield simulation used to demonstrate embodiments of the invention.
Figure 3:
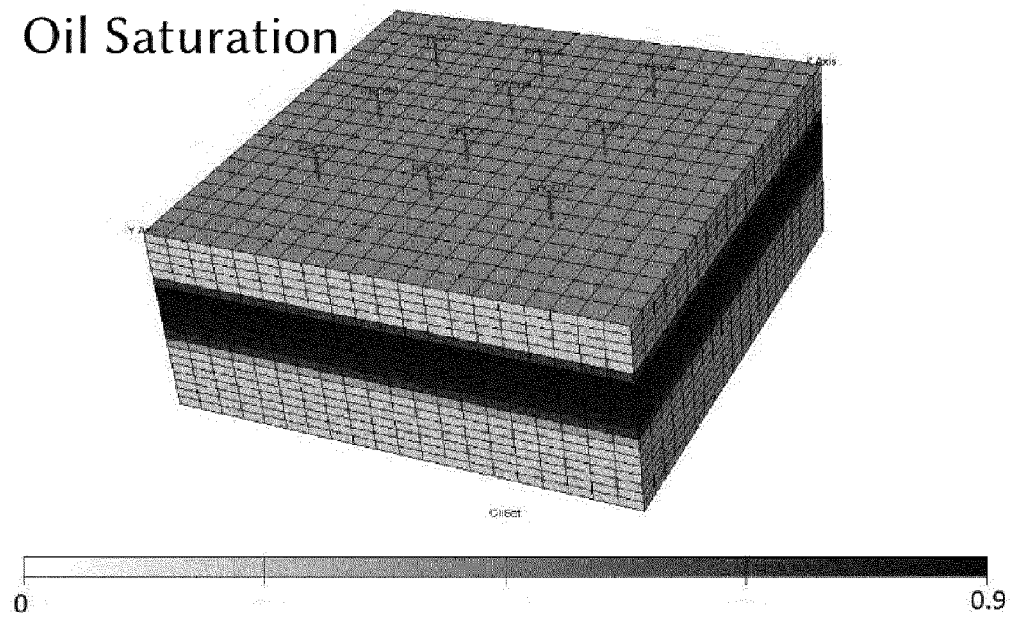
FIG. 3 shows oil saturation and pressure for the oilfield simulation.
Figure 3:
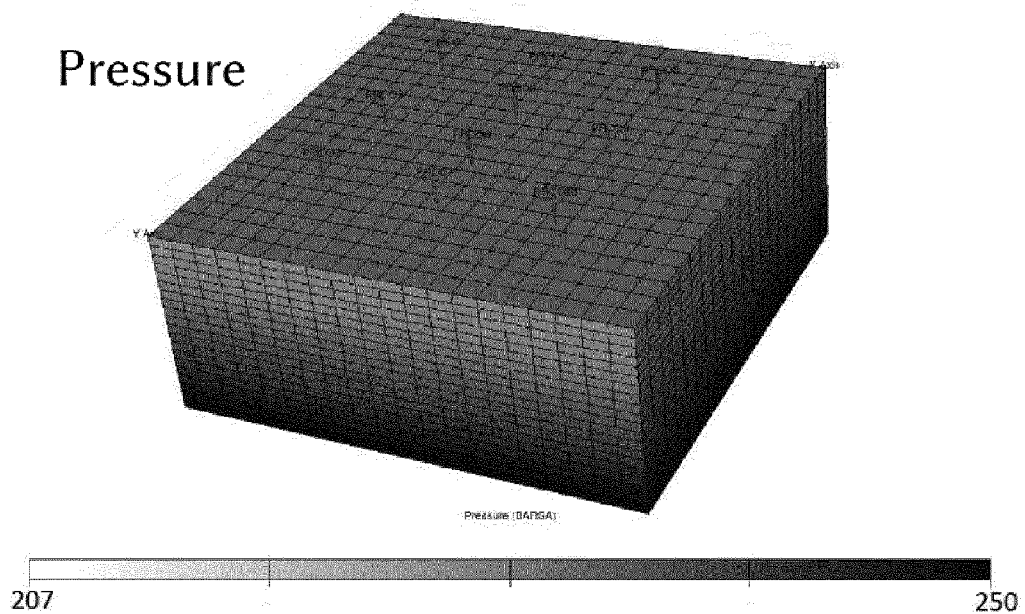

The frequencies that are used are determined based on the characteristics of the oil field and wells in a manner set out in more detail below with reference to FIG. 4. in accordance with various different embodiments of the invention, the oscillations can be applied for only a short period of time as described below with reference to FIGS. 6 and 7 or for a longer period of time which may be equivalent to the length of a conventional testing campaign as discussed below in connection with FIGS. 8 and 9, or in a further alternative the oscillations might be applied not only with different frequencies but also with varying amplitudes as discussed below in connection with FIGS. 10 and 11. The analysis in relation to those figures is derived from a simulation of an oil field using the Eclipse black oil simulation modelling package as supplied by Schlumberger Limited. The test model used an array of 20 blocks square by 20 blocks high with a grid spacing of 25 meters square by 10 meters high. The permeability was set at 300 mD and the porosity at 25%. In the model oil saturation was set at 0 in layers 1 through 7 and layers 15 through 20 and above zero in the central layers, peaking in layers 9 though 12. Pressure increases through the layers as is conventional. The simulation includes 10 vertical wells, perforated in layer 12. For the purposes of the Eclipse model the field equipment is as shown in FIG. 2. FIG. 3 shows the oil saturation and pressure for the model.

For the purposes of illustration FIG. 2 shows only two out of the ten wells 8. The wells 8 connect through choke valves 14 to a production header 2 that then feeds into a production separator 6 in a similar manner to the system described above in connection with FIG. 1. The production separator 6 has an oil output 32 with an oil flow rate $F_o$, a gas output 30 with a gas flow rate $F_g$, and also a water outlet 34 with a water flow rate $F_w$. As with the system of FIG. 1 there is a pressure control 26. As noted above, when operating in a real world system it is envisaged that oscillations in accordance with the invention will be applied through the wells via the wellhead chokes 14. The choke valves 14 would be opened and close in order to induce oscillations in the flow rate and in the wellhead pressure. However, for the purposes of this model and due to constraints in the Eclipse modelling package the variations in wellhead pressures are applied in a simulation not by a choke valve 14, but instead in a simulated wellhead pressure variation created by the software. It will of course be understood that the end result is the same. The field equipment set up in FIG. 2 relates to platform wells without a subsea manifold, although the well test is not limited only to this setup. An alternative setup is discussed below in connection with FIG. 19.

In order to achieve the best results using the current well test method it is important to select an appropriate set of frequencies that will enable multiple wells to be tested simultaneously, with the frequencies minimising interference with one another, and with it being possible to clearly identify oscillations induced in the outputs of the oil field, i.e. in measurements of the well bore pressure, oil flow rate and water flow rate during the text procedure. It will be understood that in the well bore pressures and output flow rates for an oil field there are ongoing variations in production rate. FIG. 4 shows a production waveform based on real world data from an oil field with multiple wells. The production flow fluctuates considerably about its mean flow rate and the production waveform also includes a degree of noise. In order to determine the frequency components of this signal a Fourier transform is applied. Several variations of Fourier transform can be used such as discrete Fourier transforms discrete time and discrete frequency transforms and so on. A fast Fourier transform (FFT) algorithm can also be used and this is preferred since FFT tends to be considerably faster and more efficient in terms of computing power. The input to the frequency analysis is a production waveform for total pressure or flow rate for an oilfield and the output is a complex data series whose absolute value can be depicted as shown in FIG. 4 as a series of points showing frequencies and amplitudes of those frequencies.

Figure 4:
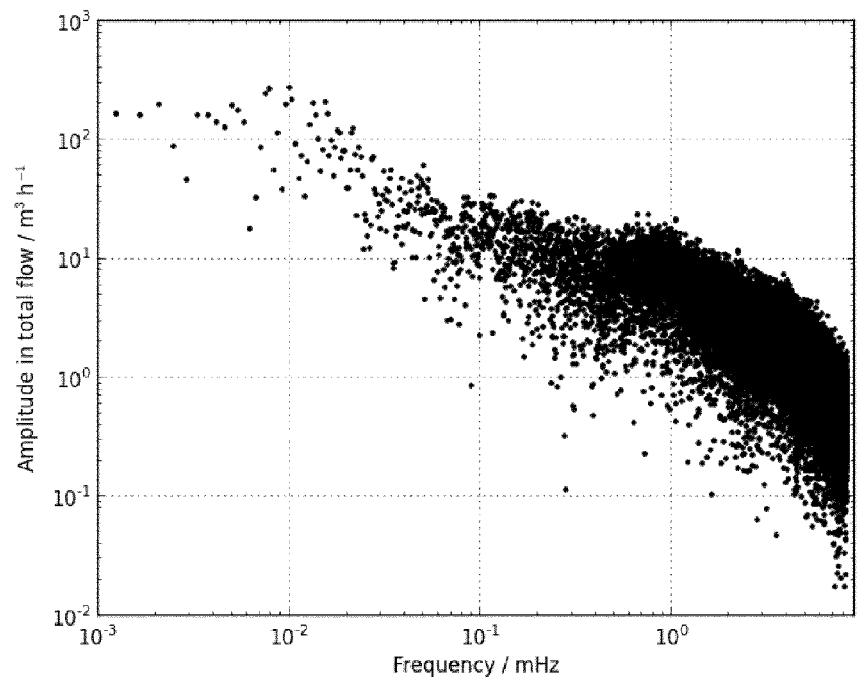
FIG. 4 illustrates the results of a frequency analysis of real-world production data from an oil field.

It will be seen from FIG. 4 that in the relatively large frequencies, i.e. frequencies in excess of 1 mHz and approaching 10 mHz and above, there are some damping effects, and so the increasingly high frequencies have a generally decreasing amplitude. Also, with low frequencies, below 0.1 mHz for this example, high amplitude events start to appear as a consequence of processes occurring during the oil production operation and these create excessive noise in the system. Similar phenomena will be seen in the production waveforms for other oil fields. The frequency window for oscillations to be applied to the wells should be selected to avoid these issues. Hence, in this case an appropriate frequency window to select for frequencies that should not suffer from damping and should be easily distinguishable from other frequency components of natural variations in the oil filled production flow would be a frequency window between 0.1 to 1 mHz, which roughly equates to periods of between 15 minutes and two and a half hours.

It is expected that frequencies in this type of range will be appropriate for many oil fields. However, an analysis of production data should be carried out for each oil field in order to find an appropriate set of frequencies that can be used in order to provide effective results from the well testing method. Another point to note is that although frequencies within the window of 0.1 to 1 mHz will generally be best for this particular oil field, it can also be useful to consider higher frequencies for some types of testing, such as composition tests, since for all composition testing the damping effects that arise at high frequencies will not be such a problem.

Figure 5:
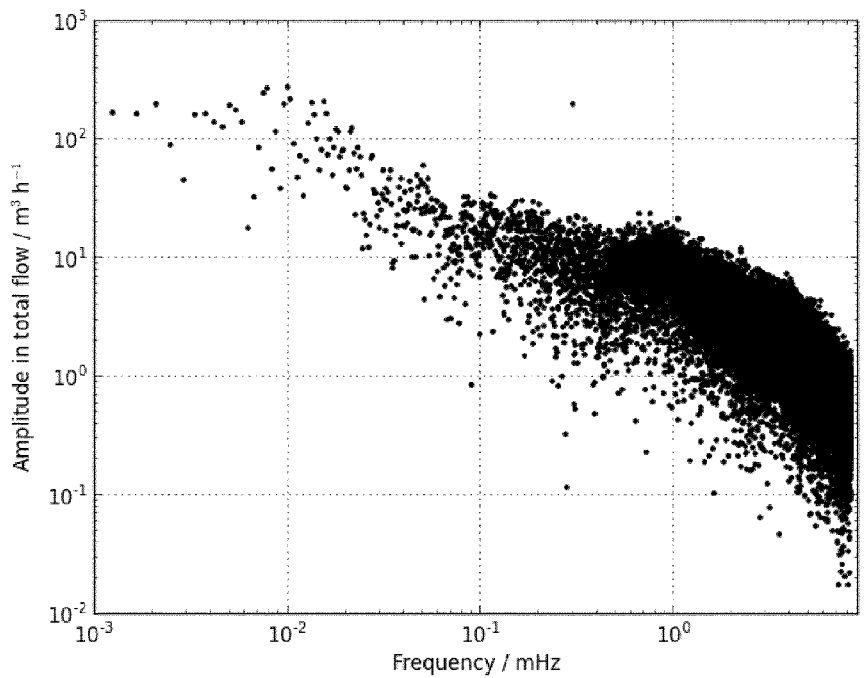
FIG. 5 illustrates the same frequency spectrum of FIG. 4, with an added oscillating term.

As an illustration of how oscillations applied at the wellhead can be used to generate data which is visible even in the context of a real world production, FIG. 5 shows similar data to that in FIG. 4 when the input production waveform is altered by the addition of a sinusoidal wave at 0.3 mHz with an amplitude of 200 cubic meters per hour at standard temperature pressure. There is no discernable effect in the original plot of production flow rate, but the frequency analysis naturally includes an extra point for the additional sinusoid as can be seen in FIG. 5, in which an additional point appears with an amplitude of 200 $Sm^3/h$ and a frequency of 0.3 mHz. It will hence be appreciated that when oscillations are introduced via the choke valve 14 at the wellhead in accordance with the present method, then the effects of these oscillations on outputs such as the flow rate can be seen when an appropriate frequency analysis.

Once the frequency range has been determined, it is also necessary to select appropriate frequencies within that range. The selected frequencies should avoid interference with each other and with significant harmonics. The relationship between the bottom pressure of the well and the wellhead pressure is nonlinear and therefore will be expected to produce a second harmonic and possibly further ones. Ideally the second harmonic should be checked to see that it is small. A low or negligible output at the second harmonic of the input frequency is an indicator that there are no higher harmonics and that there is no problem with non-linearity that could skew the results of the analysis. The test frequencies should hence be selected to avoid frequencies which will be affected by or will mask the second harmonics of other test frequencies. Hence, for example if one test frequency is set at 0.1 mHz, then 0.2 mHz should not be used as another frequency in a test. Similarly, if a frequency is set at 0.15 mHz, then 0.3 mHz should not be used as a frequency for another well in the test. In addition, the selected frequencies should have a spacing that is small enough to provide a sufficiently large total number of frequencies to cover all the wells, but large enough to avoid an excessively large sampling time. The total sampling time required is the inverse of the minimum spacing between the selected frequencies.

In the present example with a frequency window of 0.1 mHz to 1 mHz then in order to test the simulated oil field with ten wells we will naturally need ten frequencies. Since a number of frequencies will not be available for use, then in order to obtain ten test frequencies it is necessary to consider frequencies spaced close enough together to produce somewhat more than ten frequencies. This can be done by providing twenty frequency slots, allowing for up to half of the frequency slots to be removed by conflict between harmonics and so on. For this example, the range available for test frequencies is 0.1 mHz to 1 mHz, and so the potential frequency slots should be spaced apart from one another by 50 µHz to provide twenty possible frequencies. With a frequency spacing of 50 µHz, then the total time required to complete the test in order to provide a full set of results in the frequency analysis will be six hours. This compares very favourably to the minimum total time for an equivalent build-up test campaign, which might required five days.

With the frequency range of 0.1 mHz to 1 mHz and a spacing of 50 µHz it is relatively straightforward to determine a set of frequencies are available and do not cause conflict with the second harmonics of other frequencies. One possible set of frequencies is 0.1 mHz, 0.15 mHz, 0.25 mHz, 0.35 mHz, 0.4 mHz, 0.45 mHz, 0.55 mHz, 0.6 mHz, 0.65 mHz, 0.75 mHz and 1 mHz. In our example simulated oil field, which has ten wells, we can select ten out of these eleven frequencies to be applied to the ten wells. As noted above, the oscillations should be applied to the wells for a minimum time period of six hours.

Figure 6:
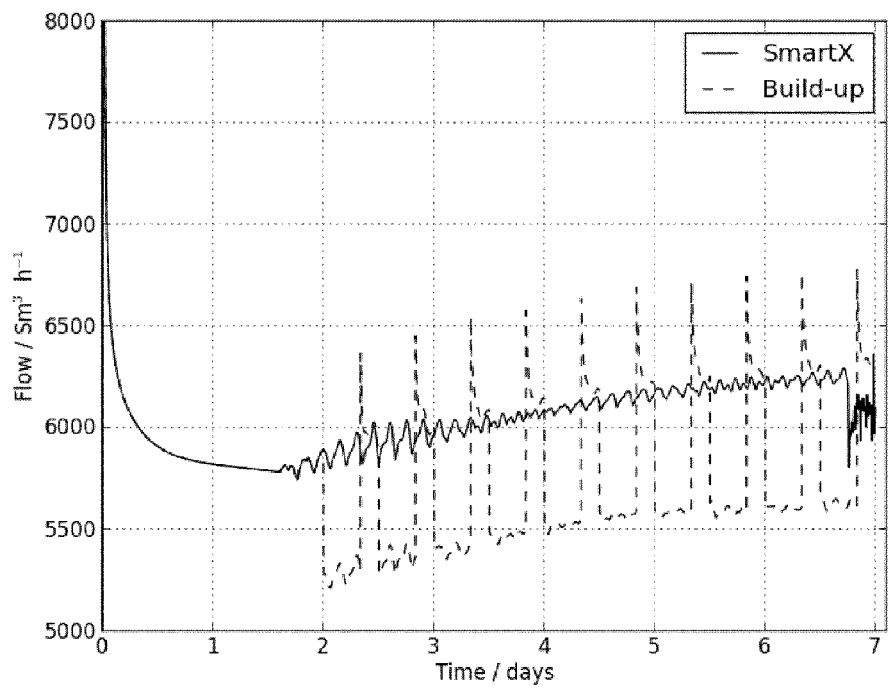
FIG. 6 is a graph derived from the oilfield simulation showing variations in production flow rate during a standard build-up test campaign and variations in production flow rate during a well test in accordance with an embodiment of the invention.

FIG. 6 shows the total output flow rate for the simulated oil field of FIG. 3 when it is tested in a conventional build up test and also when it is tested over a six hour period using the present method with oscillation frequencies selected from those listed above. The two different test regimes can easily be distinguished. In the build-up test there are ten clear cycles including a significant drop in overall flow as one well after the other is shut in and then started again. For the oscillation based testing method, a considerably shorter time period is required. As will be seen from the Figure the build-up test takes place over five days whereas the oscillation based test needs only six hours. The oscillations are applied during the final six hours of the graph. It will be understood that as a consequence of avoiding the need to shut down each well in turn production during the test campaign is greatly increased production continues uninterrupted with the only change being oscillations applying from normal changes in flow rate and wellhead pressure until the final six hours of the week long period. The consequence of this is that production using this six hour oscillation based well testing method is considerably higher in total over the text period. With the example shown total production is approximately 4.3% higher than production when the build-up test is carried out. In the example shown the flow rate for the oil field is of the order of 6000 m$^3$ per hour and this means that the added production over the test period shown can be about 42,000 m$^3$. This added oil production would have a value of several tens of millions of dollars at current rates, hence providing a significant benefit.

Whilst the test is carried out with the oscillations being applied at the resultant changes in well bore pressure, water flow rate and oil flow rate are measured and then subjected to a frequency analysis of the type described above. The results are shown in FIG. 7. As can be seen, there are clearly identifiable oscillations in the outputs of the test which correspond to the input oscillations at frequencies of 0.1 mHz, 0.15 mHz, 0.25 mHz, 0.35 mHz, 0.4 mHz, 0.45 mHz, 0.55 mHz, 0.6 mHz, 0.65 mHz and 0.75 mHz. These can be seen most clearly in the measurement of well bore pressure, but are also clearly identifiable in the flow rate measurements. Since the amplitude of the input oscillation is known, then by measuring the amplitude of the output oscillation it is possible to determine properties of the well.

Figure 7:
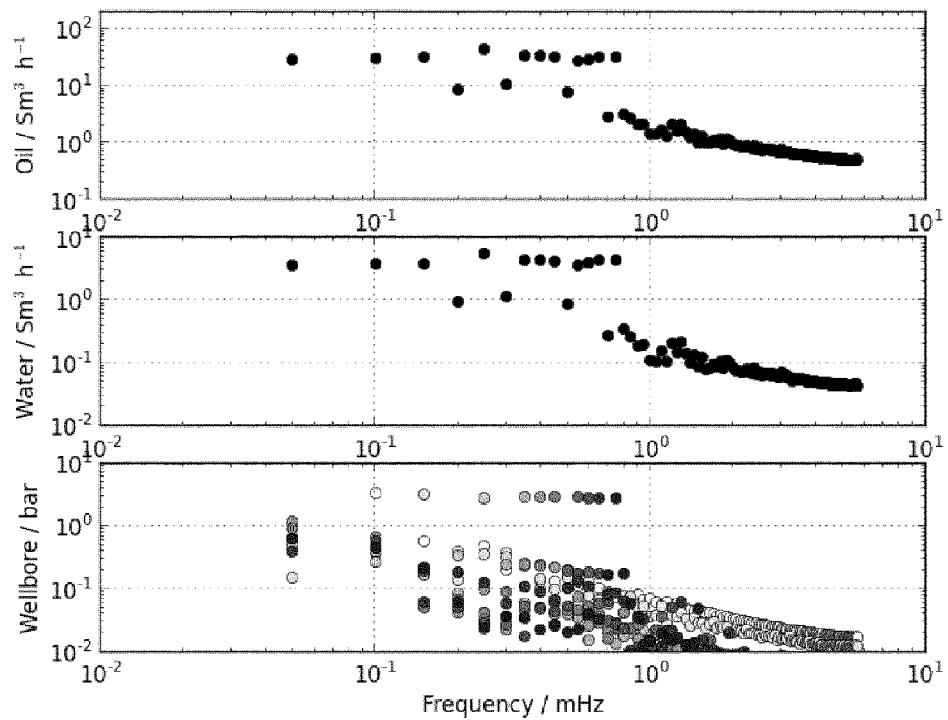
FIG. 7 shows the results of a frequency analysis of the well test in FIG. 6 including wellbore pressure, water flow rate and oil flow rate.

By way of an example, we can consider oil flow $F_o$, water flow $F_w$, and wellbore pressure p for wells 1, 5 and 10 (frequencies 0.1 mHz, 0.4 mHz and 0.75 mHz) and the information that can be derived from the results shown in FIG. 7. The oil and water production and the wellbore pressure can be read-out from the appropriate plot of FIG. 7, and the baseline amplitude, which can be determined as discussed below in relation to FIG. 11, is used to estimate the uncertainty in the value:

For well 1, $F_o$=30±14 Sm$^3$/h, $F_w$=3.7±1.5 Sm$^3$/h, p=3.3±0.7 bar.

For well 5, $F_o$=33±5 Sm$^3$/h, $F_w$=4.3±0.5 Sm$^3$/h, p=2.81±0.3 bar.

For well 10, $F_o$=31.4±2 Sm$^3$/h, $F_w$=4.2±0.2 Sm$^3$/h, p=2.74±0.01 bar.

We can then use error propagation theory to calculate water cut (WC) and productivity index (PI):

For well 1, WC=0.11±0.07 and PI=9.1±4.5 Sm$^3$/h bar

For well 5, WC=0.115±0.02 and PI=11.7±2.2 Sm$^3$/h bar

For well 10, WC=0.118±0.01 and PI=11.5±0.7 Sm$^3$/h bar

It is clear that uncertainty is very high for well 1, because the baseline (and thereby uncertainty) is higher at low frequencies.

Figure 8:
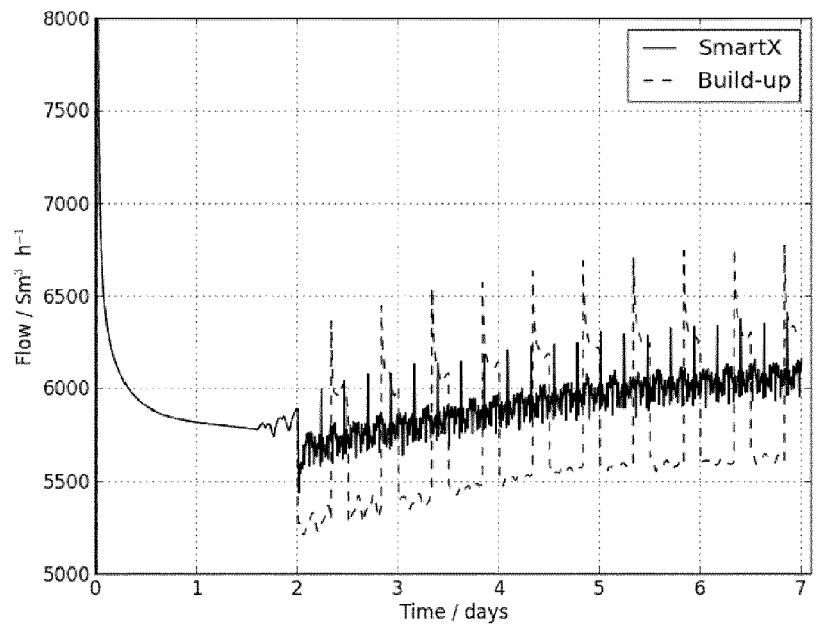
FIG. 8 is a graph derived from the oilfield simulation showing variations in production flow rate during a standard build-up test campaign and variations in production flow rate during a well test in accordance with another embodiment of the invention.
Figure 9:
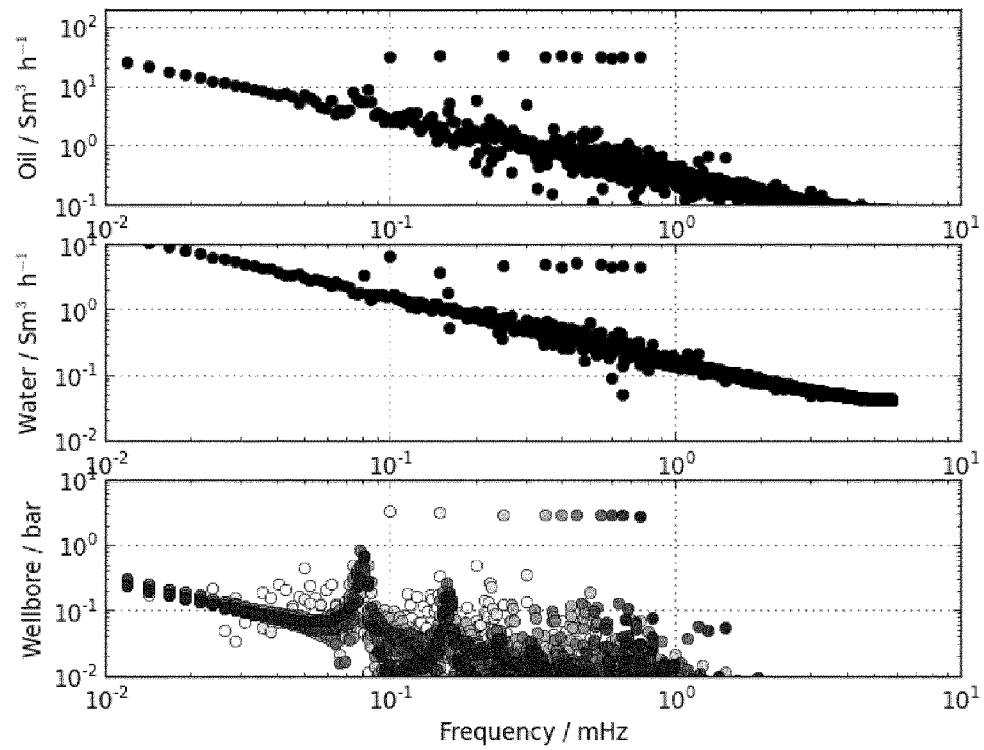
FIG. 9 shows the results of a frequency analysis of the well test in FIG. 8 including wellbore pressure, water flow rate and oil flow rate.

FIGS. 8 and 9 show similar information to FIGS. 6 and 7 with an alternative implementation of the test method. Thus as can be seen in FIG. 8 the oscillations are applied not only during the final six hours of the five day test period for the equivalent build-up test, but are also applied throughout this five day test period. This produces clearer information and a better baseline in the frequency analysis, which hence means that the output data is more accurate. Naturally, since the five day test requires a drop in production for a longer time than the six hour test then the added production compared to the conventional build-up test is smaller, being approximately 2.2% or in this case about 22,000 m³. In practice, the length of the test can be set for a given oil field and for a given test requirement based on prior experience of the accuracy of the data in a short test, and based on the nature of the testing. If the test is a simple routine test for monitoring of well performance without any need to for highly detailed and accurate data, then a short test could be performed. On the other hand if I it is necessary to obtain highly detailed information about various properties of each one, then it may be appropriate to perform a longer test.

Considering the measurements for wells 1, 5 and 10 in a similar manner to that set out above, the following is found:

For well 1, $F_o$=31.3±2 Sm³/h, $F_w$=6.6±1.5 Sm³/h, p=3.31±0.05 bar.

For well 5, $F_o$=32.3±0.8 Sm³/h, $F_w$=4.45±0.4 Sm³/h, p=2.89±0.02 bar.

For well 10, $F_w$=31.0±0.4 Sm³/h, $F_w$=4.45±0.2 Sm³/h, p=2.78±0.01 bar.

From which we get:

For well 1, WC=0.174±0.04 and PI=9.5±0.6 Sm³/h bar

For well 5, WC=0.121±0.012 and PI=11.2±0.7 Sm³/h bar

For well 10, WC=0.126±0.006 and PI=11.15±0.15 Sm³/h bar

These values are much more precise, although for well 10 additional precision was not necessarily required compared to the 6 hour test. It should be noted that these values are not directly comparable to the previous case, as they measure WC and PI over five days: a source of uncertainty is also the variation of parameters over the five days of sampling: the uncertainty around $F_w$ is about the same as the previous case.

Figure 10:
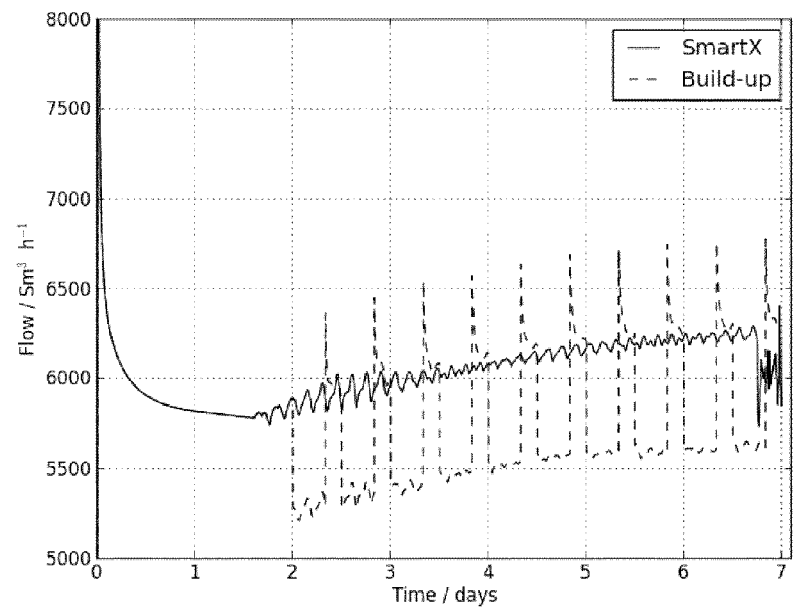
FIG. 10 is a graph derived from the oilfield simulation showing variations in production flow rate during a standard build-up test campaign and variations in production flow rate during a well test in accordance with a further embodiment of the invention.
Figure 11:
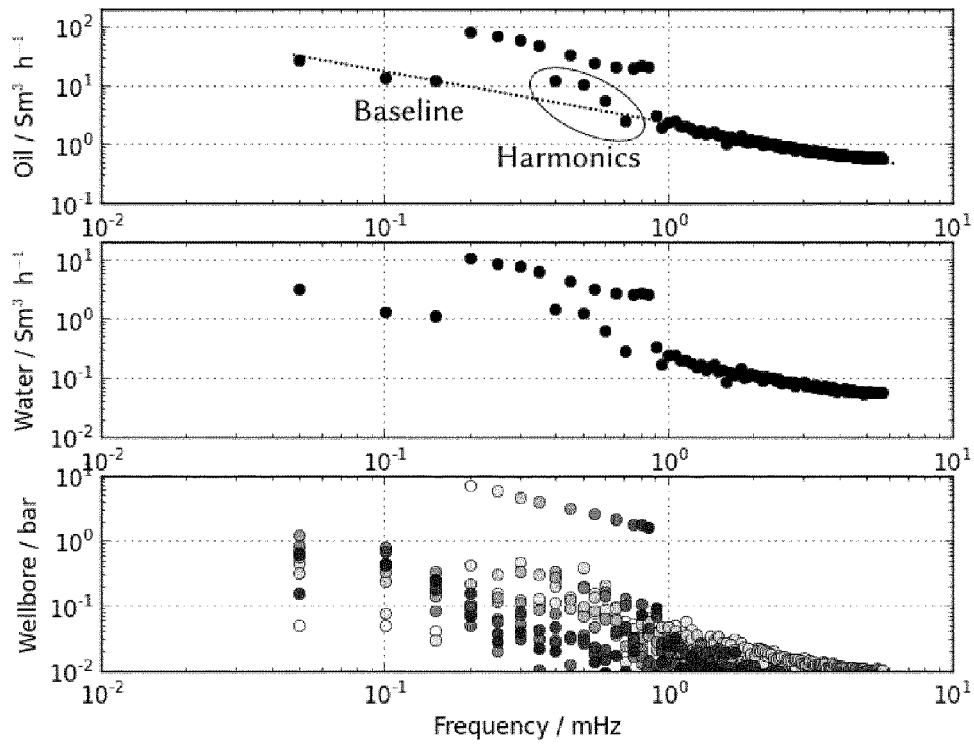
FIG. 11 shows the results of a frequency analysis of the well test in FIG. 10 including wellbore pressure, water flow rate and oil flow rate.

FIGS. 10 and 11 show another alternative embodiment. The testing that is applied is similar to the test of FIG. 8 in that it is applied only for six hours and is shown at the end of the conventional build-up test period. However, the applied oscillations differ from those in FIG. 6 in that they are scaled with larger oscillations for low frequencies. This avoids inaccuracies introduced by the baseline gradient in the underlying frequency spectrum.

FIG. 11 includes an illustration of a baseline amplitude approximated by a line that is fit to the underlying data. To determine a line of best fit the data points at the test frequencies and their second harmonics are ignored and a line is fit to the remaining data using a least squares analysis or similar. As can be seen in FIGS. 7, 9 and 11 the baseline has a gradient that increases for lower frequencies. The use of scaled oscillations can therefore improve the accuracy of the output data by keeping it clear of the baseline. The increase in production compared to production during the build-up test is similar to the increase in production for the non-scaled oscillations.

Applying the same analysis of for wells 1, 5 and 10, we find:

For well 1, $F_o$=81.3±10 Sm³/h, $F_w$=10.5±1 Sm³/h, p=7.05±0.2 bar.

For well 5, $F_o$=32.2±5 Sm³/h, $F_w$=4.2±0.6 Sm³/h, p=3.05±0.08 bar.

For well 10, $F_o$=20.1±2 Sm³/h, $F_w$=2.6±0.3 Sm³/h, p=1.58±0.02 bar.

From which we get:

For well 1, WC=0.114±0.018 and PI=11.5±1.45 Sm³/h bar

For well 5, WC=0.115±0.024 and PI=10.6±1.7 Sm³/h bar

For well 10, WC=0.115±0.018 and PI=12.7±1.28 Sm³/h bar

The precision in estimated parameters is now uniformly about 10% as a result of the scaled oscillations. These results are comparable with the first batch as they are measured over the same time frame. Precision can be further increased either by extending the sampling time or by increasing the oscillation amplitude.

Figure 12:
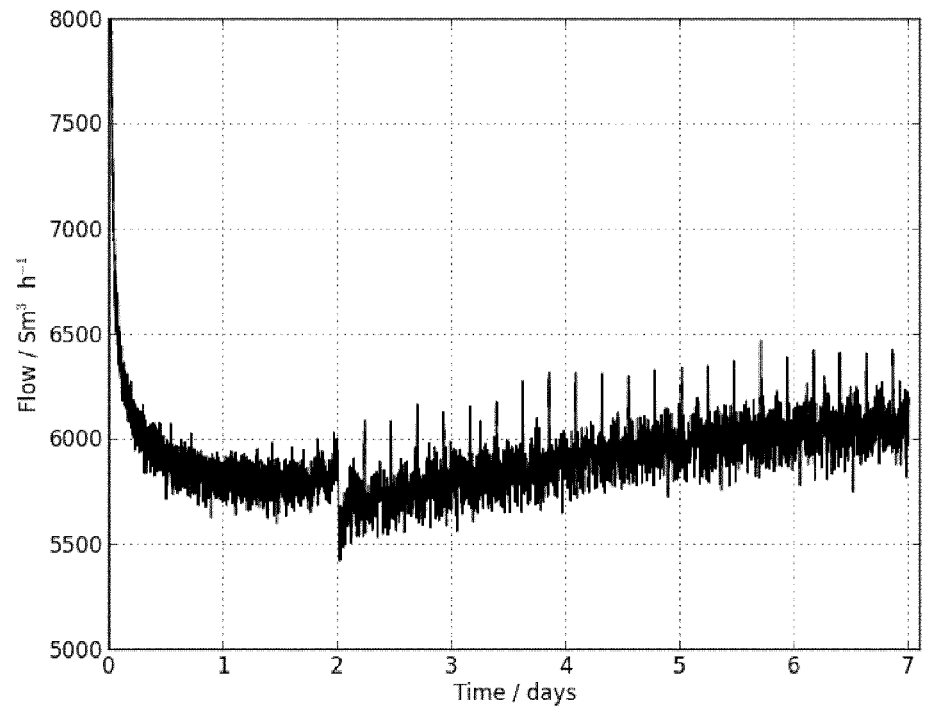
FIG. 12 is a graph derived from the oilfield simulation showing variations in production flow rate during a well test in accordance with an embodiment of the invention similar to that of FIG. 8, with the addition of noise.
Figure 13:
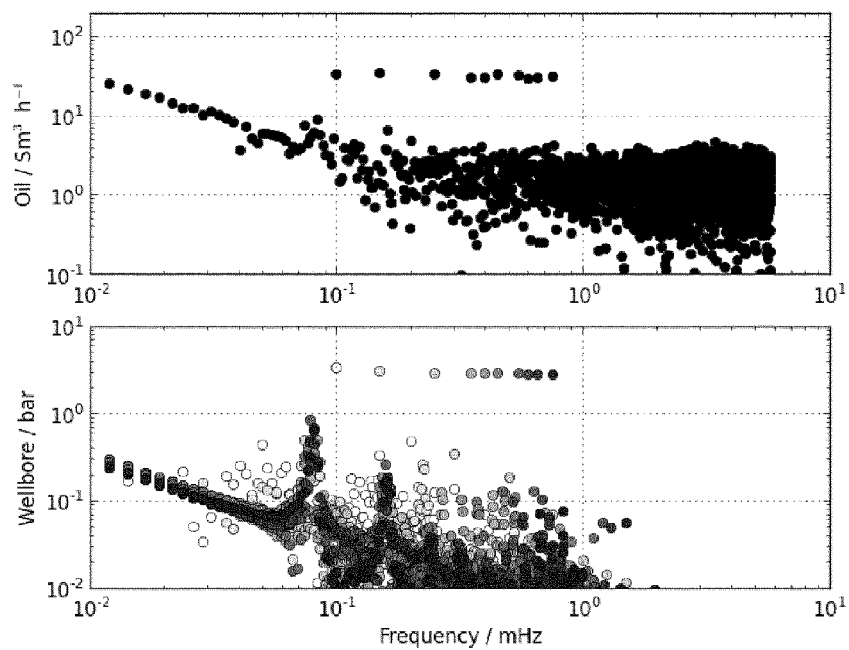
FIG. 13 shows the results of a frequency analysis of the data in FIG. 12 including wellbore pressure and flow rate.

FIG. 12 shows another set of data from the simulation in which the frequency oscillation well test is applied over a five day period. In FIG. 12, random measurement noise is added to the date in order to simulate noise that might be shown in real world data. FIG. 1135 shows the output from a frequency analysis of well bore pressure and oil flow rate for the noisy data of FIG. 12. It will be seen that in comparison to the equivalent data shown in FIGS. 8 and 9 there is no significant additional difficulty in extracting information regarding the properties of the various wells, even when the noise has been added. Instead the noise generally simply creates additional data points at the higher frequencies, which of course are outside the selected frequency range for the applied oscillations.

Figure 14:
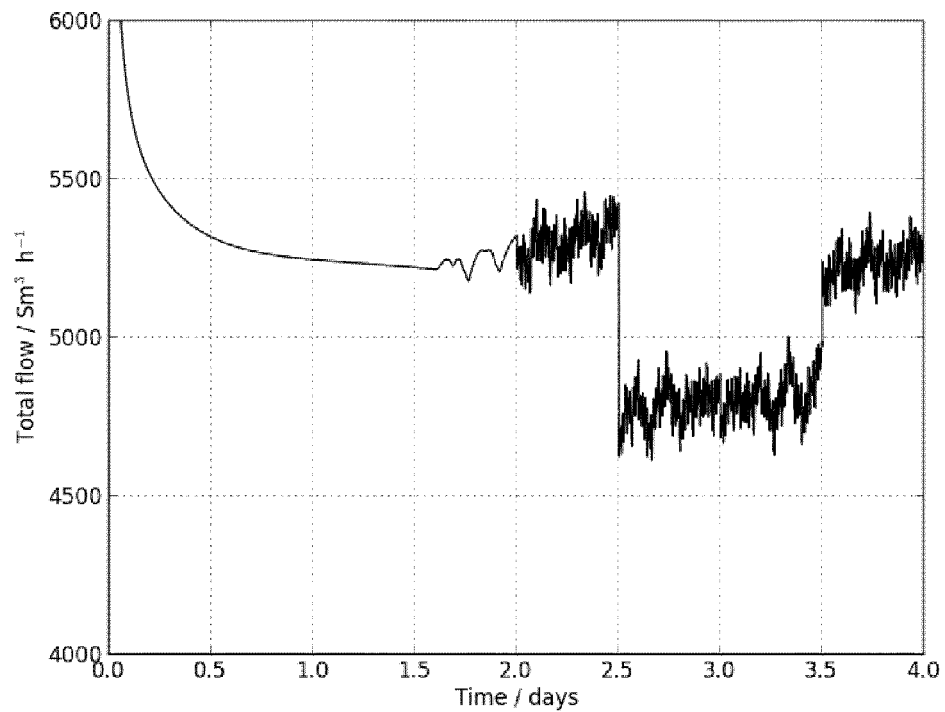
FIG. 14 is a graph derived from the oilfield simulation showing variations in production flow rate during a well test in accordance with an embodiment of the invention when the test occurs in parallel with well shut in and start up.
Figure 15:
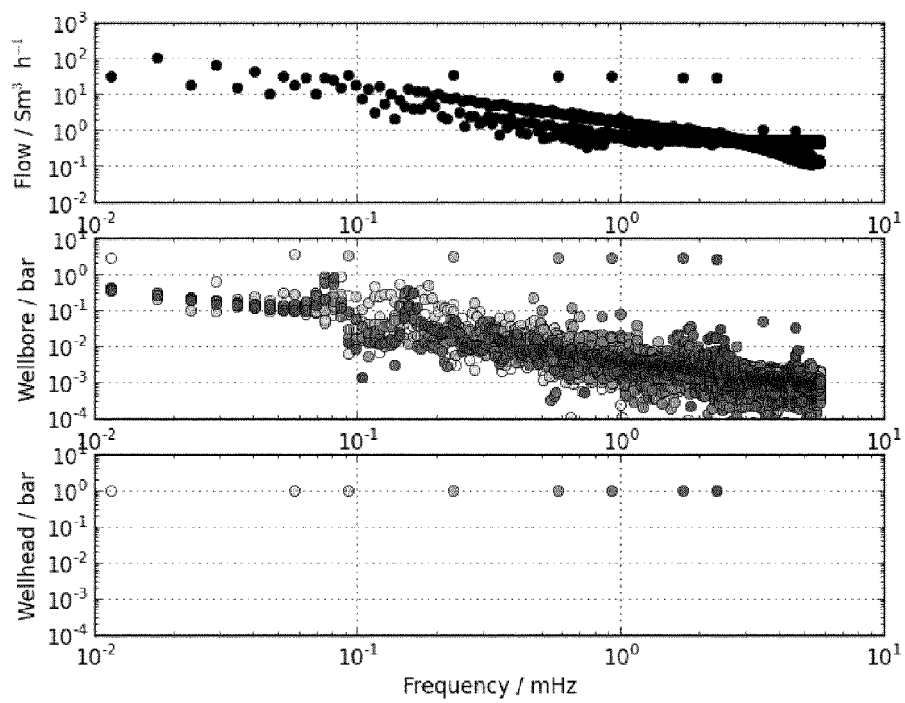
FIG. 15 shows the results of a frequency analysis of the data in FIG. 14 including wellhead pressure, wellbore pressure and flow rate.
Figure 16:
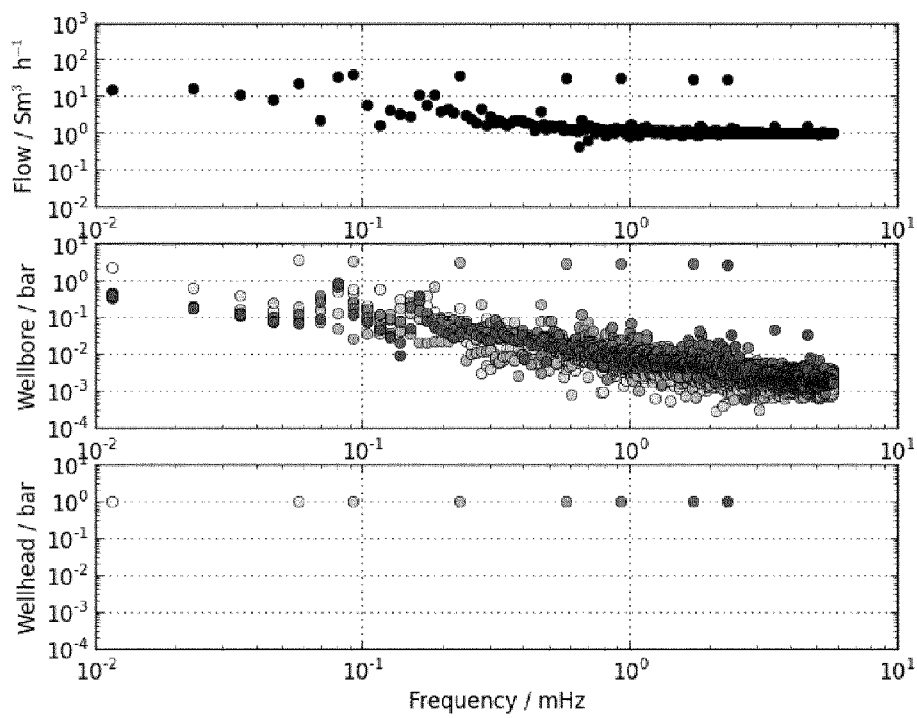
FIG. 16 shows the results of a frequency analysis of the data in FIG. 14 when the step changes arising from shut in and start up are excluded.

FIG. 14 shows another simulation with the oscillation well test being carried out from day two onwards, but with shutting in of a well at 2.5 days and start-up of a well at 3.5 days. With the oscillation based well testing method it is possible to extract useful data from a test campaign even if shut-ins and start-ups occur in parallel. If the entirety of the data is analysed then the results are as shown in FIG. 15, and there is an additional baseline arising from interference applied by the shutting and start-up. However, with the oscillation based method it is possible to avoid this additional noise in the data to generate suitably accurate results by selecting only some of the data from the test run. For example, in this case it is possible to select only the data occurring prior to the shut-in, and to use that data as the basis for the analysis. FIG. 16 shows how a cleaner data set can be obtained in this way. Since the region of data to be analysed can be selected after the data has been gathered, then it is possible to avoid adverse effects on a test campaign that might otherwise occur when there was an unexpected need for a shut-in or similar event.

Figure 17:
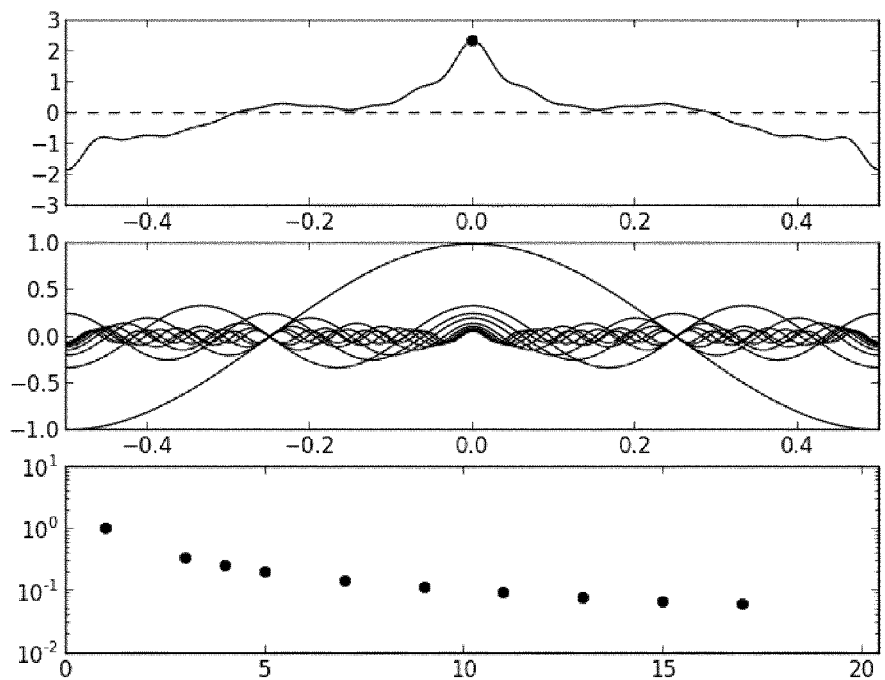
FIG. 17 illustrates sinusoids of oscillations applied in accordance with an embodiment of the invention along with a plot of resultant variations in pressure.

As well as selecting appropriate frequencies for the oscillations to be applied at the wellhead it is also advantageous in some cases to apply the oscillations with a carefully selected phase difference. This has particular benefit during process limited operation of an oil field, since it can reduce variations in production. FIG. 17 shows a set of sinusoidal waves with ten frequencies selected from twenty frequency slots in a similar manner to the frequencies discussed above. The lower plot in FIG. 17 shows the spacing of the frequencies. The middle plot shows sinusoidal waves representing production, each with their peak starting at a time zero, and the upper plot shows the sum of these waves. It will be seen that the peak pressure variation is above 2 on the scale shown.

Figure 18:
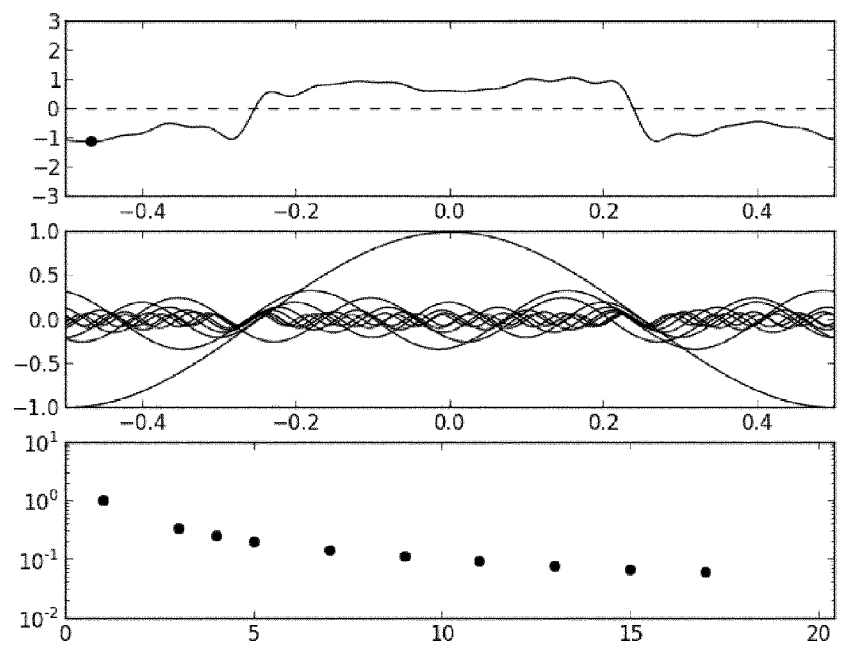
FIG. 18 shows a similar set of sinusoids with phases adjusted to optimise production.

Synchronisation of the peaks of the sinusoidal waves as in FIG. 17 will produce the highest possible peak pressure variation. A large production variation is a disadvantage for process limited operation. It is therefore beneficial to adjust the phase of the applied waveforms in order to reduce the production variation. FIG. 18 shows an alternative where the sinusoidal waves are applied with phase optimisation. In this case the phase variation was selected using a brute force method. The maximum deviation from average production is reduced by more than half and is approximately 1 on the scale shown. The output of the testing will be identical since the same frequencies are applied and the different phase of the frequencies will not affect the frequency analysis. However, the adverse effect on the production process is greatly reduced. This type of phase optimisation should hence be applied for process limited operation.

Figure 19:
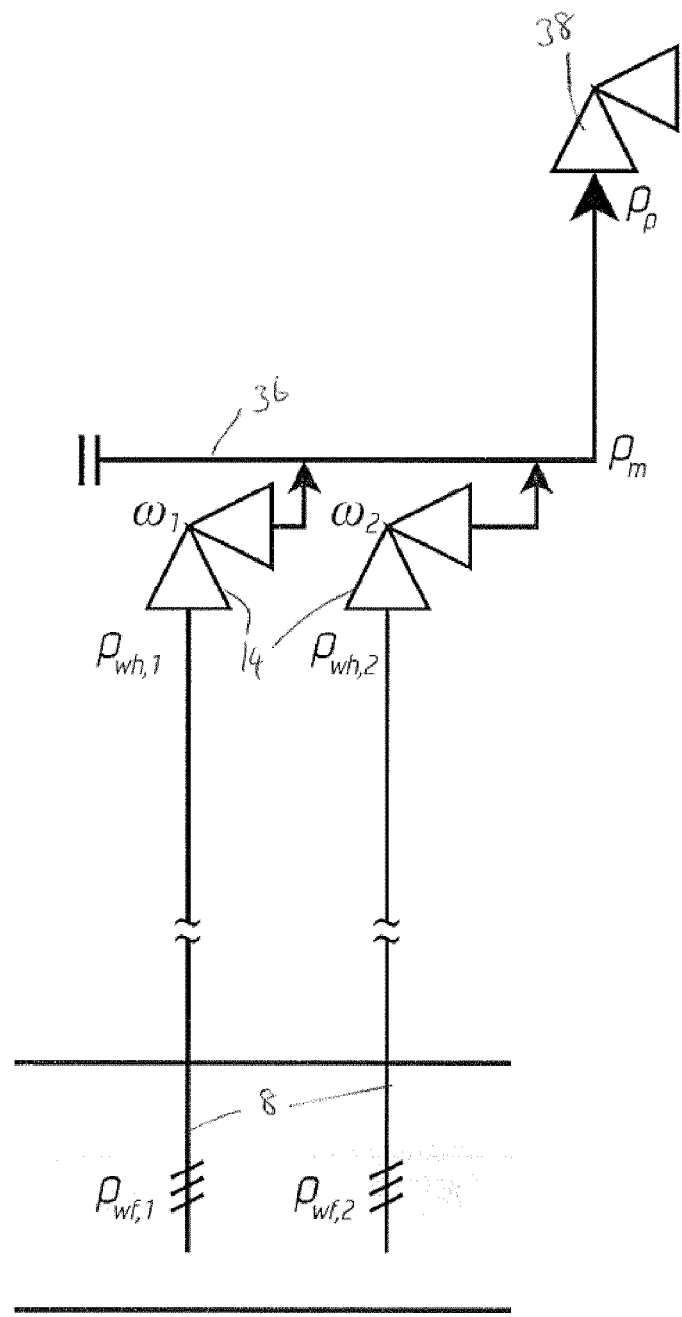
FIG. 19 shows an alternative field equipment set up.

As noted above, although the simulation uses field equipment based on platform wells without a subsea manifold, it is also possible to make use of the oscillation based well test method in other equipment setups. FIG. 19 shows an arrangement with a subsea manifold 36 which connects to a platform choke 38. As with FIG. 2 only two wells 8 are shown, although naturally more wells 8 could be connected to the manifold 36. The wells 8 connect to the subsea manifold 36 via valves 14. With this arrangement when an oscillation is applied to the valves 14 a problem can arise since the manifold 36 may oscillate with both frequencies. The reason that this can arise with a subsea manifold arrangement as shown in FIG. 19 is that there is often no pressure control of the subsea manifold 36. The manifold pressure can therefore vary and it will be affected by the oscillations of the choke valves 14. Thus, when a first valve 14 is excited with the frequency $\omega_1$ and a second valve 14 is excited with the frequency $\omega_2$ then there is frequency leakage and the manifold 36 may oscillate with both frequencies $\omega_1$ and $\omega_2$. As a consequence, both wells 8 will be excited with the two frequencies and the frequency earmarking of the wells 8 is lost. This does not prevent application of the oscillation based method of well testing to set-ups using a subsea manifold, but steps have to be taken to avoid frequency leakage.

One solution is to apply pressure control to the manifold 36. Another solution is to use supersonic flow in the check valves 14. Many wells already run using supersonic flows and existing systems could be adapted to use the supersonic flow rates. With supersonic flows the pressure in the manifold will have no effect on the flow rates through the valve and any pressure variations in the manifold are essentially invisible to the valve and to the flow and pressure at the opposite side of the valve. The choke flow will be affected only by the well pressure and by the choke position. As a consequence, an oscillation can be applied which will only affect the well connected to that particular choke valve and will not leak into other wells. A more comprehensive solution, that does not require changing the flow regimes in the wells, is to account for all frequencies by means of matrix inversion. In this more general approach, the oscillation amplitudes of all test frequencies in the downhole pressure of every well is related to the oscillation are measured, and related to the oscillation amplitudes of oil, gas and/or water flow by means of the wells' productivity indices. The result is, for every test frequency, an equation in the form:

$$J_1 * P_{1,i} + J_2 * P_{2,i} + \ldots = F_i$$

Where $F_i$ is the oscillation amplitude in the gas, oil or water flow at frequency i, and $p_{j,i}$ is the oscillation amplitude in downhole pressure for well j at frequency i. Having measured all the oscillations $F_i$ and $p_{j,i}$, the values of the productivity indices J can be found by matrix inversion. There are also methods available in the open literature to calculate error propagation through a matrix inversion.

The invention claimed is:

1. A method of well testing to determine properties of oil and gas wells, the method comprising:
    applying oscillations to the flow rate and/or pressure at multiple wells, wherein the oscillations applied at different wells of the multiple wells are at different test frequencies;
    receiving measurements of flow(s) downstream of a production header that combines the flows from the multiple wells and/or receiving measurements of pressure and/or temperature from individual wells;
    carrying out a frequency analysis of the pressure, flow rate and/or temperature measurements to determine pressure, flow rate and/or temperature variations induced by the applied oscillations; and
    determining properties of the different wells of the multiple wells based on the results of the frequency analysis at the test frequencies for the wells.

2. A method as claimed in claim 1, wherein the pressure/flow rate for the multiple wells is controlled at the wellheads of the well via choke valves in order to apply the oscillations.

3. A method as claimed in claim 1, wherein a frequency range for the test frequencies is a range selected from frequencies between 0.01 mHz to 10 mHz.

4. A method as claimed in claim 1, comprising selecting the test frequencies for the oscillations by carrying out frequency analysis of a production waveform for the wells to find a typical production frequency spectrum and identifying a suitable frequency range for the test frequencies.

5. A method as claimed in claim 4, wherein the frequency range is selected by removing higher frequencies that exhibit damping and/or by removing lower frequencies that are obscured by noise.

6. A method as claimed in claim 3, comprising determining the test frequencies to be used for the oscillations at the wells by determining a spacing for frequency slots within the frequency range based on the number of frequencies required and/or on the total test period available.

7. A method as claimed in claim 6, wherein the frequency spacing for the test frequencies is selected to ensure that the minimum required test time is limited to a predetermined maximum value.

8. A method as claimed in claim 3 comprising avoiding the selection of test frequencies within the frequency range that will be affected by and/or will mask the second harmonics of other, previously selected, test frequencies.

9. A method as claimed in claim 1, including grouping wells and testing them in batches.

10. A method as claimed in claim 1, wherein the amplitude of the input oscillations is in the range of 10-10000 Sm$^3$/h, preferably 50-1000 Sm$^3$/h.

11. A method as claimed in claim 1, comprising determining a baseline amplitude for the selected frequency range by determining a line of best fit for the production frequency spectrum and setting the amplitude for the input oscillations to be at least five times larger than the baseline amplitude, preferably at least ten times larger.

12. A method as claimed in claim 11, wherein the amplitudes for each test frequency are scaled to match a gradient in the baseline amplitudes at the test frequencies.

13. A method as claimed in claim 1, wherein the test time is set to be the minimum sampling time for the frequency analysis of the pressure, flow rate and/or temperature measurements;
    wherein the test time is set to be at least five times larger than the minimum sampling time for the frequency analysis of the pressure, flow rate and/or temperature measurements;
    wherein the method includes applying oscillations to the well for a total test time in excess of the minimum sampling time for the frequency analysis of the pressure, flow rate and/or temperature measurements, and then selecting a sampling time from the total test time for further analysis, the sampling time being shorter than the total test time.

14. A method as claimed in claim 1, wherein the measured pressure, flow rate and or temperature includes one or more of wellbore pressure, wellbore temperature, wellhead pressure, wellhead temperature, oil flow rate, gas flow rate, and/or water flow rate;
    wherein the measured flow rates are taken in the flow(s) downstream of a separator that receives the flow from the production header, whereas the measured pressures and/or temperatures are measured at the wellhead and/or at the wellbore of the wells.

15. A method as claimed in claim 1, comprising determining properties of the different wells by determining wellhead and/or wellbore pressure and/or flow rate amplitude values at the test frequencies and using these amplitudes to determine the basic properties of the individual wells.

16. A method as claimed in claim 15, comprising using a baseline amplitude for the measured wellhead and/or wellbore pressure and/or flow rate values to provide an indication of the accuracy of the results, wherein the baseline amplitude is determined by removing data points relating to the test frequencies and their second harmonics, and then determining a line of best fit for the remaining data points.

17. A method as claimed in claim 1, wherein frequency analysis of includes the use of a Fourier transform;
    wherein the step of applying oscillations includes applying the different frequencies at different phases, wherein the phases of the applied oscillations are shifted relative to one another to reduce production variation in the output flow;
    wherein the frequency analysis includes a step of measuring the level of the second harmonic for the applied test frequencies.

18. A well test apparatus for determining properties of oil and gas wells, the apparatus comprising:
    a pressure and/or flow rate controller for controlling pressure and/or flow rate at multiple wells; and
    a data analysis device for receiving and analysing measurements of flow rate in flow(s) downstream of a production header that combines the flows from the multiple wells, and/or measurements of pressure and/or temperature in individual wells;
    wherein the pressure and/or flow rate controller is configured to apply oscillations in the flow rate and/or pressure at the multiple wells using different test frequencies for different wells; and
    wherein the data analysis device is configured to carry out a frequency analysis of the measurements of pressure, flow rate and/or temperature to determine pressure, flow rate and/or temperature variations induced by the applied oscillations, and to determine properties of the different wells of the multiple wells based on the results of the frequency analysis at the test frequencies for the wells.

19. An apparatus as claimed in claim 18, wherein the pressure and/or flow rate controller is for controlling pressure and/or flow rate via choke valves at the wellheads of the wells.

\* \* \* \* \*